(12) United States Patent
Iwamoto et al.

(10) Patent No.: US 9,005,760 B2
(45) Date of Patent: Apr. 14, 2015

(54) PROCESS FOR PRODUCING PHOSPHORESCENT BODY AND PHOSPHORESCENT BODY PRODUCED BY THE PROCESS, AND NAIL STONE INCLUDING PHOSPHORESCENT BODY

(76) Inventors: Yasunori Iwamoto, Osaka (JP); Tetsuya Shibano, Osaka (JP)

( * ) Notice: Subject to any disclaimer, the term of this patent is extended or adjusted under 35 U.S.C. 154(b) by 0 days.

(21) Appl. No.: 13/880,899

(22) PCT Filed: Oct. 21, 2011

(86) PCT No.: PCT/JP2011/074319
§ 371 (c)(1),
(2), (4) Date: Apr. 22, 2013

(87) PCT Pub. No.: WO2012/053641
PCT Pub. Date: Apr. 26, 2012

(65) Prior Publication Data
US 2013/0263872 A1    Oct. 10, 2013

(30) Foreign Application Priority Data
Oct. 22, 2010 (JP) ................................ 2010-237753

(51) Int. Cl.
| | | |
|---|---|---|
| *C03B 19/10* | (2006.01) | |
| *B32B 5/16* | (2006.01) | |
| *A45D 29/00* | (2006.01) | |
| *C03B 19/06* | (2006.01) | |

(52) U.S. Cl.
CPC ............... *C03B 19/06* (2013.01); *A45D 29/00* (2013.01); *A45D 2029/005* (2013.01); *C03B 19/1005* (2013.01)

(58) Field of Classification Search
USPC ........ 428/403, 404, 406, 323; 427/212, 419.4
IPC ...................................................... C03B 19/10
See application file for complete search history.

(56) References Cited

U.S. PATENT DOCUMENTS

2010/0136305 A1 * 6/2010 Sakai .......................... 428/207

FOREIGN PATENT DOCUMENTS

| JP | 60-176933 A | | 9/1985 |
|---|---|---|---|
| JP | 09-278496 | | 10/1997 |
| JP | 11-043349 A | | 2/1999 |
| JP | 11-288233 | | 10/1999 |
| JP | 2004-359480 A | | 12/2004 |
| JP | 2005-213457 A | | 8/2005 |
| JP | 2007-112685 A | | 5/2007 |
| JP | 2007-182529 A | | 7/2007 |
| JP | 2008-081988 A | | 4/2008 |
| JP | 2008-132470 A | | 6/2008 |
| JP | 2009-203356 A | | 9/2009 |
| JP | 2010-180380 | * | 8/2010 |
| JP | 2010-180380 A | | 8/2010 |
| WO | WO2004/113449 | * | 12/2004 |
| WO | WO2010/090312 | * | 8/2010 |

OTHER PUBLICATIONS

Japanese Office Action issued May 20, 2013 for corresponding Japanese Application No. 2011-231846.
International Search Report, mailed Jan. 24, 2012.
Written Opinion of International Search Authority of PCT/JP2011/074319, mailed Jan. 24, 2012.

* cited by examiner

*Primary Examiner* — Leszek Kiliman
(74) *Attorney, Agent, or Firm* — Rader, Fishman & Grauer PLLC

(57) ABSTRACT

To provide a process for producing a phosphorescent body which allows efficient production of a granule-shaped phosphorescent body with a simple facility and a phosphorescent body produced by the process, and a nail stone including the phosphorescent body. In a process for producing a phosphorescent body containing at least a phosphorescent material and a glass material, at least the phosphorescent material and the glass material are mixed to give a paste mixture 2. A plurality of layers of the mixture 2 are stacked to form a granule-shaped laminate 3. The laminate 3 is sintered so that the laminate 3 is melted and shaped by the action of the surface tension of the melted laminate 3.

13 Claims, 5 Drawing Sheets

FIG.1
FIG.1(a) FIG.1(b)
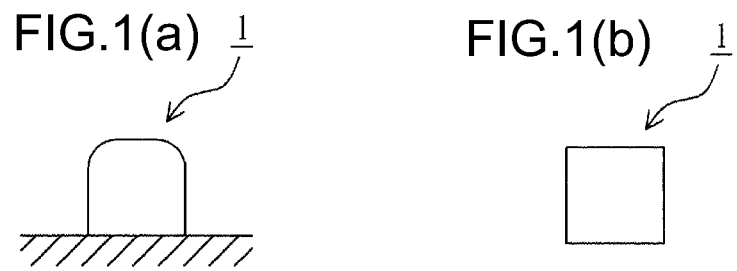
FIG.2
FIG.2(a)
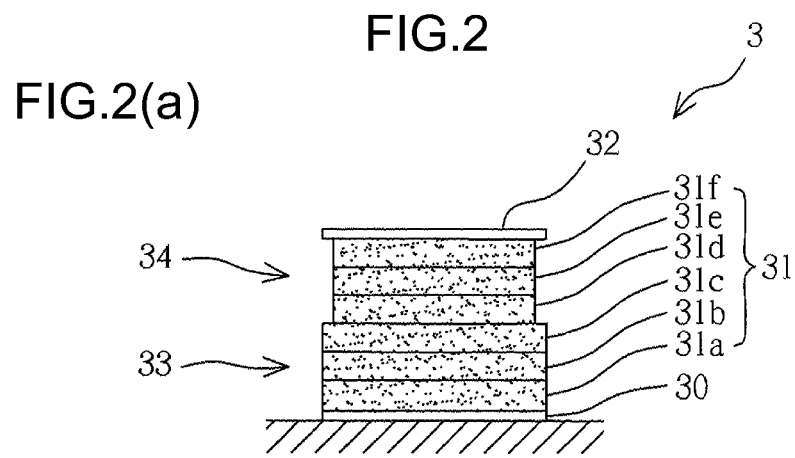
FIG.2(b)
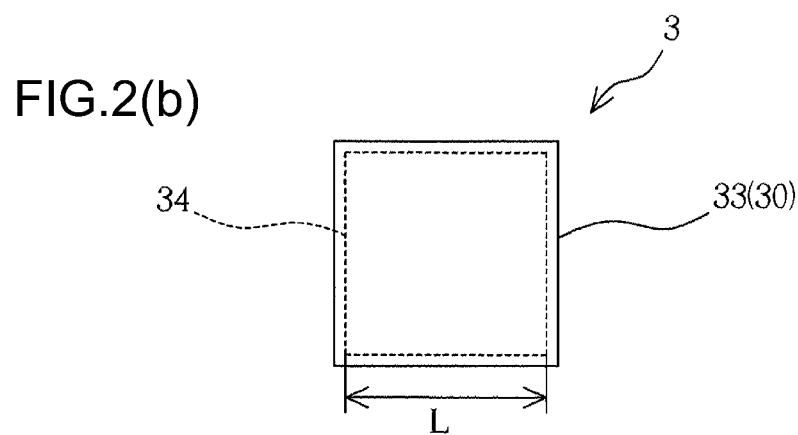

FIG.3
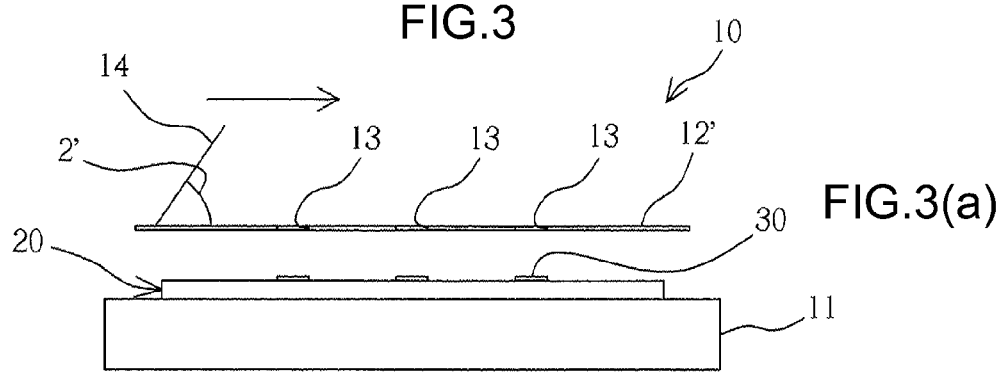
FIG.3(a)
FIG.3(b)
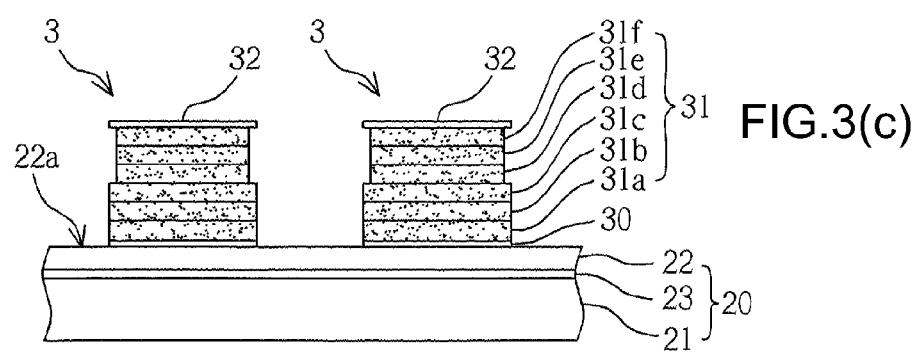
FIG.3(c)
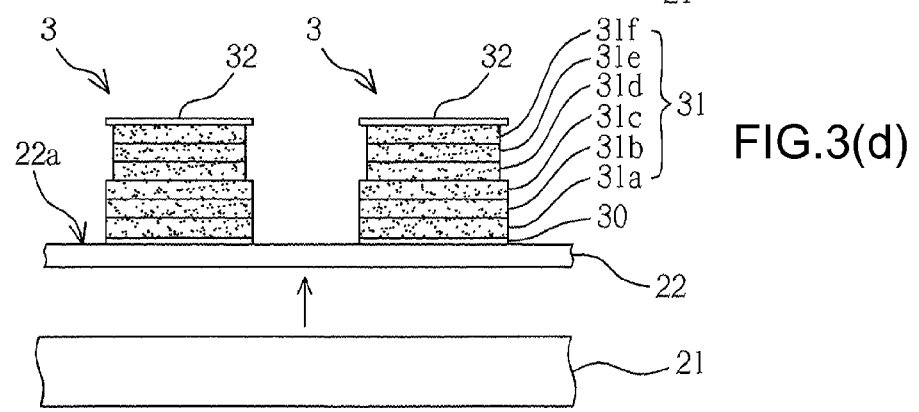
FIG.3(d)

FIG.4
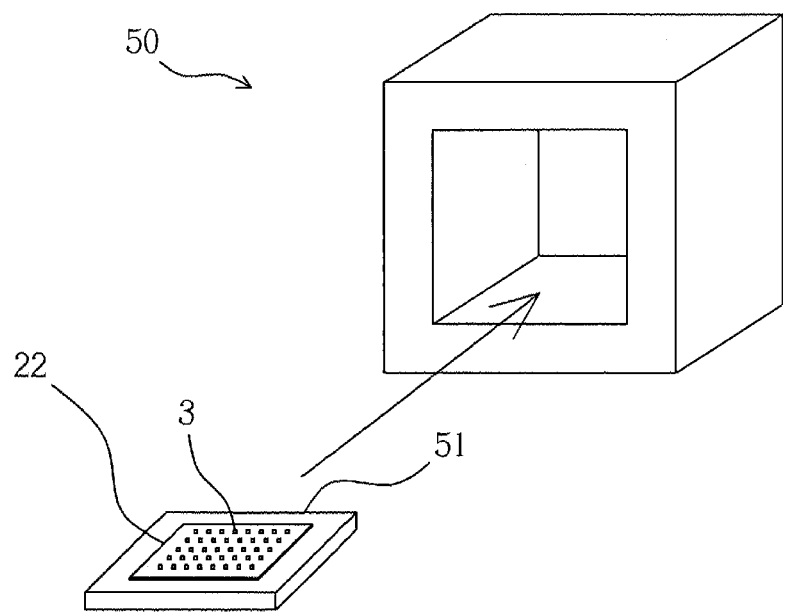
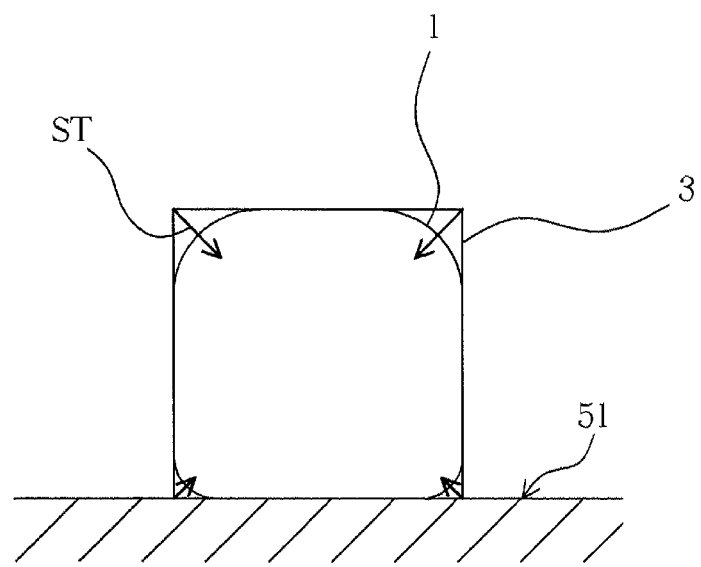
FIG.5

FIG.6
FIG.6(a)  FIG.6(b)  FIG.6(c)
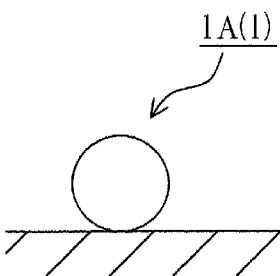 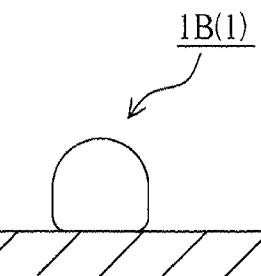 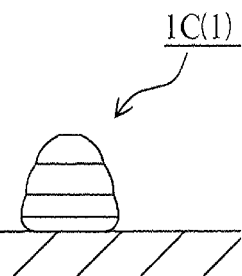
FIG.6(d)  FIG.6(e)  FIG.6(f)
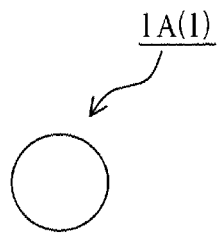 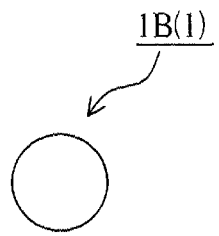 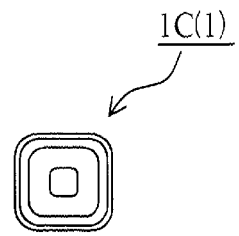

FIG.7
FIG.7(a)
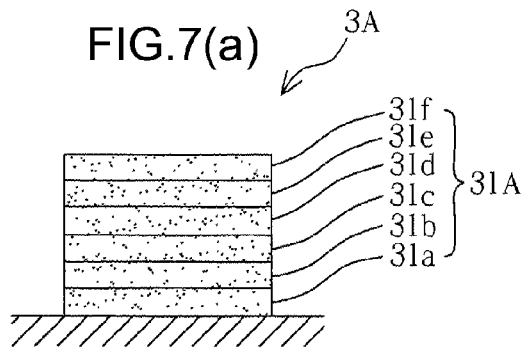
FIG.7(b)
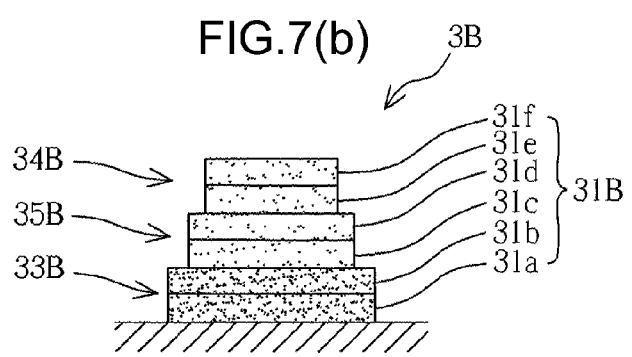
FIG.7(c)
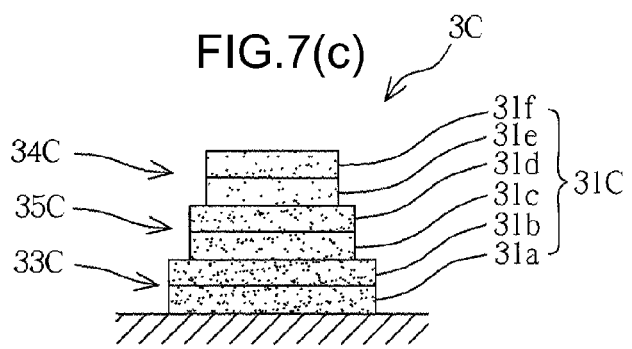
FIG.8
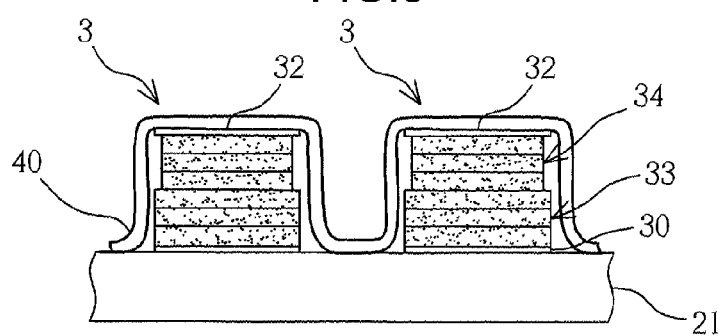

PROCESS FOR PRODUCING PHOSPHORESCENT BODY AND PHOSPHORESCENT BODY PRODUCED BY THE PROCESS, AND NAIL STONE INCLUDING PHOSPHORESCENT BODY

TECHNICAL FIELD

The present invention relates to a process for producing a phosphorescent body and a phosphorescent body produced by the process, and a nail stone including the phosphorescent body. More particularly, the present invention relates to a process for producing a phosphorescent body containing at least a phosphorescent material and a glass material, to a phosphorescent body produced by the process, and to a nail stone including the phosphorescent body.

BACKGROUND ART

As processes for producing a phosphorescent body as described above, there have been known such conventional processes as described in Patent Documents 1 to 3, for example. In Patent Document 1, a glass tube having a hollow filled with phosphorescent powder is stretched to give fibrous glass, and the fibrous glass is put into an inclined heating furnace and melted at a temperature equal to or higher than its melting point, and thereby glass spherules are produced by the action of the surface tension. In Patent Document 2, phosphorescent cullet is sintered by fluidized sintering to produce glass beads. In both the production processes, the apparatus used was complicated and large-scaled, and the production steps were also complicated.

In Patent Document 3, a mixture of a phosphorescent material and a glass material is sintered to give plate-like glass, and the plate-like glass is pulverized to have a predetermined particle diameter and sintered again to form particles each including a light-emitting portion. Therefore, the production efficiency of the particles each including the light-emitting portion was low, and the production steps were still complicated. In some cases, in addition, the shapes of the particles were non-uniform.

CITATION LIST

Patent Documents

[PATENT DOCUMENT 1] Japanese Laid-Open Patent Publication No. 60-176933
[PATENT DOCUMENT 2] Japanese Laid-Open Patent Publication No. 11-43349
[PATENT DOCUMENT 3] Japanese Laid-Open Patent Publication No. 2007-112685

SUMMARY OF THE INVENTION

Problems to be Solved by the Invention

In view of such conventional circumstances, it is an object of the present invention to provide a process for producing a phosphorescent body which allows efficient production of a granule-shaped phosphorescent body with a simple facility and a phosphorescent body produced by the process, and a nail stone including the phosphorescent body.

Solution to the Problems

In order to achieve the above-mentioned object, the process for producing a phosphorescent body according to the present invention is characterized in that it is a process for producing a phosphorescent body containing at least a phosphorescent material and a glass material, including: preparing a paste mixture by mixing at least the phosphorescent material and the glass material; forming a granule-shaped laminate by stacking a plurality of layers of the mixture; and heating the laminate so that the laminate is melted and shaped by an action of a surface tension of the melted laminate.

According to the above-described configuration, the laminate has a structure in which layers of the paste mixture are stacked, and therefore the laminate before the heating has low flowability. When melted during the heating, the laminate has increased flowability to be in a liquid state and produce surface tension. The surface tension refers to tension acting along a surface produced due to tendency of the surface itself to contract to the minimal area. The tension is produced according to the shape of the laminate. The surface tension varies with the kind of liquid. Thus, the surface tension of the melted laminate changes the shape, and shaping into a desired shape is achieved.

Preferably, the laminate formed is moved into a furnace by means of a resin support layer having adhesion to the laminate, to be heating therein. Since the resin support layer burns out due to the heating, the phosphorescent body can be produced more efficiently.

In this case, preferably, the laminate is formed by sequentially stacking the layers on a surface of the support layer and subjected to the heating while being oriented on the support layer. Since the laminate can be formed on the resin, the formation by printing or the like is facilitated. Since the laminate is heating while being on the support layer, moreover, adverse effects on the surface of the phosphorescent body after the heating can be mitigated, and the phosphorescent body can be finished more precisely.

Furthermore, it is desirable that the support layer is a transfer layer of a transfer paper, the transfer layer of the transfer paper is provided on a mount via an adhesion layer made of a water-soluble material, the adhesion layer dissolves when the transfer paper is immersed in water, and the transfer layer is separated from the mount and moved into the furnace while holding the laminate. According to this configuration, the laminate is formed on the transfer paper having the mount, and therefore the laminate is sized more precisely. Moreover, the transfer layer can be formed thin and easily separated from the mount by being immersed in water, and therefore working efficiency is further improved.

Since the stacked layers are heating, the production facility is simple. In addition, since a plurality of laminates can be prepared at the same time, the production efficiency is high and the production precision is stable.

In this case, it is desirable that the mixture is prepared by blending 1% by weight or more and 40% by weight or less of the phosphorescent material with respect to a total amount of the phosphorescent material and the glass material. When the phosphorescent material is within this numerical range, the light emission performance by the phosphorescent material can be maintained and the shaping with stable precision is achieved by the action of the surface tension.

The laminate may be formed from a plurality of kinds of mixtures different in blending amounts of the phosphorescent material. The laminate may be composed of a plurality of kinds of layers different in areas of the layers. By varying the amount of the phosphorescent pigment and the amount of the glass material among the layers of the laminate, the surface tension can be varied and the shaping into a desired shape is achieved with stable precision.

Preferably, a coat layer made of the glass material is provided beneath a lowermost layer and/or on top of an uppermost layer of the laminate. When the phosphorescent material content is increased, the phosphorescent pigment present in a surface of the phosphorescent body to be produced roughens the surface, and the smoothness is reduced. By providing the coat layer made of the glass material as the lowermost layer and/or as the uppermost layer, the smoothness can be improved. In addition, by forming the coat layer with the glass material, the light emission performance can be maintained.

Preferably, a thickness of the coat layer is made different from that of the other layers. According to this configuration, a precise shape can be obtained and a thick laminate can be formed. Thus, a phosphorescent body having high light emission performance can be produced efficiently.

Preferably, the laminate is formed by performing screen printing several times. The production facility is simple, and the production efficiency is high, allowing a large number of laminates to be prepared at the same time.

Preferably, the mixture includes a medium, and the medium is dried every time each layer is formed. If an organic solvent included in the medium is left unremoved in the heating, it turns soot to take on a dark color. The organic solvent is vaporized to prevent reduction of the light emission performance by drying the organic solvent every time each layer is formed. A phosphorescent body produced by any of the above-described phosphorescent body production processes can be used as a nail stone, for example.

Advantageous Effects of the Invention

According to the characteristics of a process for producing a granule-shaped phosphorescent body and a phosphorescent body produced by the process, and a nail stone including the phosphorescent body of the present invention, efficient production of a granule-shaped phosphorescent body with a simple facility has been achieved.

The other objects, configurations, and effects of the present invention will be apparent from the following description of embodiments section.

BRIEF DESCRIPTION OF THE DRAWINGS

FIG. 1 illustrates a phosphorescent body according to the first embodiment of the present invention, in which FIG. 1 (*a*) is a front view and FIG. 1 (*b*) is a plan view.

FIG. 2 illustrates a laminate according to the first embodiment, in which FIG. 2 (*a*) is a front view and FIG. 2 (*b*) is a plan view.

FIG. 3 illustrates a laminate formation step.

FIG. 4 illustrates a heating step.

FIG. 5 illustrates the action of the surface tension in the heating.

FIG. 6 illustrates phosphorescent bodies according to other embodiments of the present invention, in which FIG. 6 (*a*) to (*c*) are front views and FIG. 6 (*d*) to (*f*) are plan views corresponding to FIG. 6 (*a*) to (*c*).

FIGS. 7 (*a*) to (*c*) are front views of laminates of other embodiments.

FIG. 8 illustrates another embodiment corresponding to FIG. 3 (*c*).

DESCRIPTION OF EMBODIMENTS

Next, the first embodiment of the present invention will be described with reference to FIGS. 1 to 5.

A phosphorescent body 1 according to the present invention is a granule-shaped sintered body containing at least a phosphorescent pigment as a phosphorescent material and glass frit as a glass material. The phosphorescent body 1 is formed by mixing the phosphorescent pigment and the glass frit to prepare a paste mixture 2, stacking a plurality of layers of the paste mixture 2 to form a granule-shaped laminate 3, and heating the laminate 3 so that the laminate 3 is melted and shaped by the action of the surface tension of the melted laminate 3.

As illustrated in FIG. 1, the phosphorescent body 1 according to the first embodiment has a substantially cubical shape. This phosphorescent body 1 is obtained by heating the granule-shaped laminate 3 as illustrated in FIG. 2. As illustrated in FIG. 2 (*a*), the laminate 3 includes a six-layered phosphorescent layer 31 made of the mixture 2, and coat layers 30 and 32. As illustrated in FIG. 2 (*b*), the laminate 3 has a substantially square shape in plan view.

The phosphorescent layer 31 is composed of a lower layer section 33 including a first layer 31*a* to a third layer 31*c* and an upper layer section 34 including a forth layer 31*d* to a sixth layer 31*f*. As illustrated in FIG. 2 (*b*), in the present embodiment, the area of a surface perpendicular to the layer stacking direction of each of the layers 31*a* to 31*c* in the lower layer section 33 is larger than that of each of the layers 31*d* to 31*f* in the upper layer section. When the area is varied between the upper layers and the lower layers of the phosphorescent layer 31, a surface of the phosphorescent body 1 will be finished smooth. In the present embodiment, for example, a length L of a side of the upper layer section 34 is set to be approximately 10% shorter than that of a side of the lower layer section 33.

The basecoat layer 30 is provided beneath the first layer 31*a* as the lowermost layer, and the overcoat layer 32 is provided on top of the sixth layer 31*f* as the uppermost layer of the phosphorescent layer 31. The coat layers 30 and 32 are made of glass frit including no phosphorescent pigment. The basecoat layer 30 is effective in finishing corners sharp as described later. On the other hand, since the phosphorescent pigment included in the phosphorescent layer 31 has a large particle diameter, the surface of the phosphorescent body 1 may be roughened by the phosphorescent pigment. Since the overcoat layer 32 including no phosphorescent pigment is provided, the overcoat layer 32 is melted due to the heating of the laminate 3 to serve to prevent the roughness of the surface and smoothen the surface, and allow the corners (ends) of the laminate 3 to be finished smooth. Furthermore, with the coat layers 30 and 32 symmetrically provided one above the other, the surface tension during the melting of the laminate 3 is balanced, and therefore uneven surface tension can be prevented and a non-uniform shape can be prevented.

Each layer composing the phosphorescent layer 31 is thicker than the coat layers 30 and 32. It is possible to efficiently increase the phosphorescent pigment content per unit area by forming the phosphorescent layer 31 thicker. Since the coat layers 30 and 32 include no phosphorescent pigment, the surface tension acts thereon more than on the phosphorescent layer 31. Thereby, the phosphorescent body being shaped can be finished smooth, and light emission performance can be efficiently enhanced.

As the phosphorescent pigment, for example, used is a pigment obtained by adding an activator of a rare-earth element and a co-activator to an aluminate compound of an alkali earth metal as a main component, and sintering the same. As the alkali earth metal, at least one or more metal elements such as calcium, strontium, and barium; and alloys of these metal elements with magnesium may be exemplified. As the activator of a rare-earth element, europium, dysprosium, and the like may be exemplified. As the co-activator, elements such as lanthanum, cerium, praseodymium, neodymium, samarium, cadmium, terbium, and dysprosium may be exemplified. For the phosphorescent pigment, other than oxide phosphors as mentioned above, sulfide phosphors such as CaS:Bi (blue purple light emitting), CaSrS:Bi (blue light emitting), ZnS:Cu (green light emitting), and ZnCdS:Cu (yellow-orange light emitting) may also be used. The above-mentioned compounds may be mixed as appropriate, and besides other inorganic phosphor pigments and organic phosphor pigments having light storage properties may be used.

For the glass frit, for example, materials containing silicon oxide, aluminum oxide, boron oxide and alkali oxide as main components, and containing at least one alkali earth metal oxide selected from the group consisting of calcium oxide, strontium oxide, and magnesium oxide may be used. The materials of the glass frit are not limited to the above-mentioned materials, but it is desirable to use a material that melts (liquefies) at a temperature at which the phosphorescent pigment can exist in a solid state. It is also desirable to use a glass frit material exhibiting high transparency after the heating. Light emission by the phosphorescent pigment is not hindered, and reduction of the light emission performance is prevented.

Here, the production steps of the phosphorescent body 1 according to the present embodiment will be described. The production steps generally include a mixture preparation step of preparing the paste mixture 2, a laminate formation step of forming the laminate 3 by stacking a plurality of layers of the prepared paste mixture 2, and a heating step of heating the laminate 3 to shape the laminate 3, while being melted, into a desired shape by the action of the surface tension.

In the mixture preparation step, powders of a phosphorescent pigment and glass frit are mixed with a liquid medium to prepare the paste mixture 2. Here, the phosphorescent pigment is blended in an amount within the range from 1% by weight to 40% by weight with respect to the total amount of the phosphorescent pigment and the glass frit. As long as the amount of the phosphorescent pigment is within this range, it is possible to shape the laminate 3 melted in the heating step into a desired shape by the action of the surface tension without reducing the light emission performance by the phosphorescent pigment. Then, the liquid medium is mixed in an appropriate amount with respect to the total amount of the blended solid components (the phosphorescent pigment and the glass frit in the form of powders) to prepare the paste mixture 2.

In the present embodiment, for example, the phosphorescent pigment is blended in an amount of 30% by weight with respect to the total amount of the phosphorescent pigment and the glass frit. Then, the liquid medium is mixed in an amount of 40% by weight with respect to the total amount of the blended solid components. That is, the phosphorescent pigment, the glass frit, and the medium are blended at a ratio of 3:7:4 to prepare the paste mixture 2.

Here, as the medium 4, may be used a one- or two-pack medium based on acryl, alkyd, epoxy, urethane, acrylic silicone, fluorine, melamine, or the like, for example. The medium is not limited to these materials as long as it serves to bond the phosphorescent pigment and the glass frit in the form of powders in order to form the granule-shaped phosphorescent body 1. For example, squeegee oil, various binders, or the like can be used. In the blending, in addition to the phosphorescent pigment, the glass frit, and the medium, an additive such as a dye may be added to the extent that the light emission performance is not affected.

Next, the laminate formation step will be described.

In the present embodiment, a plurality of laminates 3 described above are formed at the same time by screen-printing the mixture 2 on a transfer paper 20 as a supporting member by using a printer 10. By employing the screen-printing, it is possible to efficiently form a large quantity of laminates 3. Here, as illustrated in FIG. 3 (c), the transfer paper 20 includes a mount 21, a transfer layer 22 as a support layer made of a resin film, and a water-soluble adhesion layer 23 for bonding the mount 21 and the transfer layer 22. For example, a transfer paper that is generally used for painting on ceramics can be used. The transfer layer 22 may be any material which has adhesion to the laminates 3 and which burns out when the laminates 3 are heating. For the transfer layer 22, for example, acrylic acid ester copolymers, vinyl resins, cellulose resins, and other resin materials such as hydrocarbons are used. The adhesion layer 23 is made of a transfer paper glue such as starch, dextrin, polyvinyl alcohol, polyvinylpyrrolidone, arabic gum, and water-soluble acrylic resin, for example.

First, as illustrated in FIG. 3 (a), a screen printing plate 12' having openings 13 is attached to the printer 10. The transfer paper 20 is disposed on a holder 11 and positioned relative to the screen printing plate 12' attached. Here, the transfer paper 20 is fixed to the holder 11 with a fixation member such as tape in order to prevent displacement during the screen printing. In the present embodiment, a 150-mesh plate is used as the screen printing plate 12' to form the basecoat layer 30. By printing the basecoat layer 30 including no pigment with the fine screen printing plate 12', it is possible to form the corners sharp.

Then, a paste glass material 2' obtained by mixing the medium and the glass frit is placed on the screen printing plate 12', and a squeegee is moved on an upper surface of the screen printing plate 12'. Thereby, the glass material 2' is extruded toward a lower surface through the openings 13 to be applied (printed) on the transfer layer 22 of the transfer paper 20. Thus, the coat layer 30 is formed.

Next, the screen printing plate 12' is replaced with a screen printing plate 12 having a different mesh size. Since the phosphorescent pigment has a large particle size, a screen printing plate 12 that allows the phosphorescent pigment included in the mixture 2 to pass through the openings 13 is selected. In addition, the use of a screen printing plate having larger openings than the above-mentioned screen printing plate allows the phosphorescent layer 31 to be thicker. Thereby, the phosphorescent pigment content per unit area is increased, and the light emission performance of the phosphorescent body 1 can be enhanced. In the present embodiment, the screen printing plate 12' is replaced with a 60-mesh screen printing plate 12.

Then, as illustrated in FIG. 3 (b), the paste mixture 2 is placed on the screen printing plate 12, and the squeegee 14 is moved on an upper surface of the screen printing plate 12. Thereby, the mixture 2 is applied (printed) through the openings 13, and the first layer 31a of the phosphorescent layer 31 is formed on an upper surface of the basecoat layer 30.

By repeating this process several times, a number of layers corresponding to the number of times of the printing are sequentially stacked as illustrated in FIG. 3 (c) to form each laminate 3 on a surface 22a of the transfer layer 22. In the present embodiment, the phosphorescent layer 31 having a six-layered structure of the first layer 31a to the sixth layer 31f is formed by performing the screen printing six times. Then, the screen printing plate 12 is replaced with the 150-mesh screen printing plate 12' again, and the overcoat layer 32 is formed on top of the sixth layer 31f of the phosphorescent layer 31.

The shape of the openings 13 can be determined as appropriate; it may be polygonal such as triangular and quadrate; circular; oval; and so on. In addition, the plurality of openings 13 may have the same shape as in the case of the present embodiment or may have different shapes and sizes. In the present embodiment, the openings 13 have a substantially square shape and are formed at appropriate intervals.

In some cases, incidentally, the medium used in the mixture 2 and in the glass material 2' includes an organic solvent containing carbon. In such cases, the carbon in the organic solvent turns soot to take on a dark color, and therefore the luminance of the phosphorescent body 1 is reduced, if the medium is left unremoved in the subsequent heating. Therefore, a drying step of drying the medium is provided every time one layer is formed. Thereby, the organic solvent present in each layer is completely vaporized and eliminated, so that the reduction of the luminance of the phosphorescent body 1 is prevented. In the present embodiment, each layer is dried to vaporize or evaporate the organic solvent every time the above-described screen-printing is performed. The drying step is performed by exposing the layer to warm air for a predetermined period of time, for example.

After the formation of the laminates 3 by the screen printing performed several times, the transfer paper 20 is immersed in water as illustrated in FIG. 3 (d). Thereby, the water-soluble adhesion layer 23 dissolves, and the transfer layer 22 peels off and separates from the mount 21 with the laminates 3 being held on the transfer layer 22.

Next, the heating step will be described.

In the present embodiment, as illustrated in FIG. 4, the plurality of laminates 3 are placed on a heating underlay 51 by means of the transfer layer 22 and moved into a furnace 50. The laminates 3 positioned (oriented) on the transfer layer 22 on the underlay 51 are placed in the furnace 50 and heating at a predetermined temperature (for example, 800° C.). Thereby, shaping is performed by using the surface tension of the laminates 3. The transfer layer 22 burns out due to the heating. The heating underlay 51 is not particularly limited as long as it is a material or has a structure that prevents the laminates 3 from being sintered thereonto, and examples of the usable underlay include an alumina sheet.

Here, the surface tension refers to tension acting along the surface of a liquid produced by tendency of the surface of the liquid itself to contract to the minimal area. When the laminates 3 are heating to go through melting, the glass frit included in the laminates 3 is melted to be a liquid glass component. As a result, the laminates 3 produce surface tension. On the other hand, the phosphorescent pigment has a higher melting point than the glass frit and exists in a solid state at the melting temperature of the glass frit. Accordingly, the surface tension ST produced by the laminates 3 varies according to the phosphorescent pigment content (blending amount).

In the present embodiment, 30% by weight of the phosphorescent pigment is included with respect to the total amount of the blended solid components (the phosphorescent pigment and the glass frit in the form of powders). When the laminates 3 are heating at a predetermined temperature (for example, 800° C.), the substantially square laminates 3 are rounded at each side and corner by the action of its own surface tension ST as illustrated in FIG. 5. Because of the surface tension ST, the phosphorescent bodies 1 having a substantially cubical shape are obtained.

Next, the second embodiment of the present invention will be described. In the following embodiment, the same members as in the previously described embodiment are denoted by the same reference characters.

In the first embodiment, 30% by weight of the phosphorescent pigment is blended with respect to the total amount of the phosphorescent pigment and the glass frit, and the substantially square laminates 3 are heating to give the phosphorescent bodies 1. In the second embodiment, however, 5% by weight or more and 20% by weight or less of the phosphorescent pigment is blended with respect to the total amount of the phosphorescent pigment and the glass frit. Within this numerical range, the phosphorescent pigment content in the laminates 3 in the heating is less than that in the first embodiment. Accordingly, the surface tension ST produced in the heating will be larger. As a result, it is possible to produce a spherical phosphorescent body 1A as illustrated in FIGS. 6 (a) and (d). For example, 10% by weight of the phosphorescent pigment is blended with respect to the total amount of the phosphorescent pigment and the glass frit.

In this case, preferably, the openings 13 of the screen printing plate 12 are formed into a substantially circular shape in the laminate formation step. In the first embodiment, the pair of coat layers 30 and 32 are provided on top of and beneath the phosphorescent layer 31 of each laminate 3. In the second embodiment, however, the coat layer 32 is not formed. The coat layer 30 can be provided as appropriate according to the shape. Alternatively, the coat layer 30 or 32 can be provided to only one of the uppermost or lowermost layers.

Lastly, the possibility of other embodiments will be mentioned.

The shape of the phosphorescent body 1 is not limited to the substantially cubical shape in the first embodiment or to the spherical shape in the second embodiment. For example, the phosphorescent body 1 can be shaped into a hemispherical shape as illustrated in FIGS. 6 (b) and (e) or into a step-like substantially conic shape as illustrated in FIGS. 6 (c) and (f). In the first and second embodiments, as illustrated in FIG. 2 and FIG. 7 (a), the phosphorescent layers 31 and 31A of the laminates 3 and 3A are formed by stacking layers of the same mixture 2. However, the laminate 3 can be formed by combining a plurality of kinds of mixtures different in blending amounts of the phosphorescent pigment.

Where the phosphorescent body is formed into a hemispherical shape, as illustrated in FIG. 7 (b), for example, a laminate 3B is formed by forming, into a step-like shape, three kinds of layers different in areas: a lower layer section 33B, an upper layer section 34B, and a middle layer section 35B. Furthermore, the upper layer section 34B and the middle layer section 35B, and the lower layer section 33B are formed from two kinds of mixtures different in phosphorescent material contents. In the present embodiment, for example, each layer of the upper layer section 34B and the middle layer section 35B is formed from a mixture having a phosphorescent pigment content of 10%, and each layer of the lower layer section 33B is formed from a mixture having a phosphorescent pigment content of 30%. The smaller phosphorescent pigment content results in a smaller amount of the phosphorescent pigment present as a solid component in the melted laminate. Accordingly, the smaller the phosphorescent pigment content (the smaller the blending amount) is, the larger the action of the surface tension of the melted laminate is. In the present embodiment, therefore, the upper layer section 34B and the middle layer section 35B are more affected by the surface tension to form a spherical surface. As a result, the phosphorescent body 1B is formed into a hemispherical shape.

Where the phosphorescent body is formed into a step-like substantially conic shape, as illustrated in FIG. 7 (c), for example, a laminate 3C is formed by forming, into a step-like shape, three kinds of layers different in areas: a lower layer section 33C, an upper layer section 34C, and a middle layer section 35C as in the former case. Here, the sections 33C to 35C are formed from three kinds of mixtures different in phosphorescent pigment contents. In the present embodiment, for example, the lower layer section 33C is formed from a mixture having a phosphorescent pigment content of 30%, the middle layer section 35C is formed from a mixture having a phosphorescent pigment content of 20%, and the upper layer section 34C is formed from a mixture having a phosphorescent pigment content of 10% to produce the laminate 3C. In the present embodiment, the action of the surface tension increases towards the upper layer section 34B. As a result, a phosphorescent body 1C is formed into a substantially conic shape.

In the above-described embodiments, the layers of each laminate 3 different in areas are formed into a step-like shape. However, the arrangement of the plurality of kinds of layers different in areas is not limited to the step-like shape and can be determined as appropriate. In the above-described embodiment, furthermore, the plurality of layers of each laminate 3 have the same thickness. However, the laminate 3 can be formed of a plurality of layers having different thicknesses.

As described above, the phosphorescent body 1 having a desired shape can be produced by adjusting the surface tension of the melted laminate 3 by selecting and combining as appropriate the blending amount of the phosphorescent pigment and the shape of the laminate 3.

In the laminate formation step in the first embodiment, the phosphorescent layer 31 having the six-layered structure is formed by performing the screen printing six times with the use of the 60-mesh screen printing plate 12, and the cover coat layer 32 is formed with the use of the 150-mesh screen printing plate 12'. However, the mesh size of the screen printing plate and the number of times of the printing are not limited thereto and can be selected as appropriate.

In the first and second embodiments, in addition, each layer of the phosphorescent layer 31 of the laminate 3 is formed by using the screen printing plate 12 having the same mesh size. However, the layers can be formed by using screen printing plates having different mesh sizes and performing the screen printing several times in combination.

In the second embodiment, the spherical phosphorescent body 1A is produced by repeating the screen printing several times. However, the production of the spherical phosphorescent body 1A is not limited to the screen printing. For example, the spherical phosphorescent body 1A may be produced by drop-wise applying drops of the mixture 2 onto the transfer paper 20 and forming and heating the drops on the heating underlay 51. In the above-described embodiments, in addition, brushing or spraying can be employed instead of the screen printing.

In the first embodiment, instead of the use of the transfer paper 20 having the transfer layer 22, a support layer 40 may be formed over the laminates 3 printed, as illustrated in FIG. 8, for example. The support layer 40 is formed of a material such as those mentioned for the adhesion layer 23 as well as acrylic acid ester copolymers, vinyl resins, cellulose resins, and other resin materials such as hydrocarbons, for example. The support layer 40 is not particularly limited and may be any material which has adhesion to the laminate 3 and which burns out when the laminates 3 are heating. The plurality of laminates 3 together with the support layer 40 are moved to and placed on the underlay 51, and then heating. Thereby, the support layer 40 burns out and the phosphorescent bodies 1 are produced.

INDUSTRIAL APPLICABILITY

The present invention is applicable as a process for producing a phosphorescent body and a phosphorescent body produced by the process, and a phosphorescent body. In particular, the phosphorescent body produced by the production process according to the present invention is applicable as a nail stone and applicable also as accessories such as artificial jewels, for example.

DESCRIPTION OF THE REFERENCE CHARACTERS 1, 1A, 1B, 1C granule-shaped phosphorescent body
2 mixture
2' glass material
3, 3A, 3B, 3C laminate
10 printer
11 holder
12, 12' screen
13 opening
14 squeegee
20 transfer paper (support member)
21 mount
22 transfer layer (support layer)
22a surface
23 adhesion layer
30 basecoat layer (coat layer)
31 phosphorescent layer
32 overcoat layer (coat layer)
33, 33A, 33B, 33C lower layer section
34A, 34B, 34C upper layer section
35B, 35C middle layer section
40 support layer
50 furnace
51 heating underlay
ST surface tension

The invention claimed is:
1. A process for producing a phosphorescent body containing at least a phosphorescent material and a glass material, comprising:
  preparing a mixture by mixing at least the phosphorescent material and the glass material without a resin adhesive agent in a manner that the mixture has a paste consistency;
  forming a granular laminate by stacking a plurality of layers of the mixture with at least one layer of the mixture stacked on top of another layer of the mixture to form a first granular laminate shape; and
  heating the granular laminate so that the granular laminate melts and deforms the first granular laminate shape into a second granular laminate shape being different from the first granular laminate shape by an action of a-surface tension of the melting granular laminate.
2. The process for producing a phosphorescent body according to claim 1, wherein the granular laminate formed is moved into a furnace by means of a resin support layer having adhesion to one surface of the granular laminate, to be heated therein.
3. The process for producing a phosphorescent body according to claim 2, wherein the granular laminate is formed by sequentially stacking the layers on a support layer surface of the support layer and being subjected to the heating while being oriented on the support layer.

4. The process for producing a phosphorescent body according to claim 3, wherein the support layer is a transfer layer of a transfer paper, the transfer layer of the transfer paper is provided on a mount via an adhesion layer made of a water-soluble material, the adhesion layer dissolves when the transfer paper is immersed in water, and the transfer layer is separated from the mount and moved into the furnace while holding the granular laminate.

5. The process for producing a phosphorescent body according to claim 1, wherein the mixture is prepared by blending 1% by weight or more and 40% by weight or less of the phosphorescent material with respect to a total amount of the phosphorescent material and the glass material.

6. The process for producing a phosphorescent body according to claim 1, wherein the granular laminate is formed from a plurality of kinds of mixtures different in blending amounts of the phosphorescent material.

7. The process for producing a phosphorescent body according to claim 1, wherein the granular laminate is composed of a plurality of kinds of layers different in areas of the layers.

8. The process for producing a phosphorescent body according to claim 1, wherein a coat layer made of the glass material is provided beneath a lowermost layer and/or on top of an uppermost layer of the granular laminate.

9. The process for producing a phosphorescent body according to claim 8, wherein a thickness of the coat layer is made different from that of the other layers.

10. The process for producing a phosphorescent body according to claim 1, wherein the granular laminate is formed by performing screen printing several times.

11. The process for producing a phosphorescent body according to claim 1, wherein the mixture includes a medium, and the medium is dried every time each layer is formed.

12. A phosphorescent body article of manufacture, comprising:
    a phosphorescent body containing at least a phosphorescent material and a glass material,
    the phosphorescent body obtained by forming a granular laminate from a mixture by mixing at least a phosphorescent material and a glass material without a resin adhesive agent into a paste consistency and stacking a plurality of layers of the mixture one on top of another to form a first granular laminate shape, and heating the granular laminate so that the granular laminate in the first granular laminate shape melts and deforms the first granular laminate shape into a second granular laminate shape being different from the first granular laminate shape by an action of a surface tension of the melting granular laminate.

13. A nail stone including the phosphorescent body article of manufacture according to claim 12.

\* \* \* \* \*